United States Patent [19]

Treasurer

[11] Patent Number: 5,504,145
[45] Date of Patent: Apr. 2, 1996

[54] WATER-DISPERSIBLE POLY(URETHANE-UREA) COMPOSITIONS

[75] Inventor: Urvee Y. Treasurer, River Edge, N.J.

[73] Assignee: The Thompson Minwax Company, Upper Saddle River, N.J.

[21] Appl. No.: 115,280

[22] Filed: Aug. 31, 1993

[51] Int. Cl.$^6$ .................................................. C08G 18/08
[52] U.S. Cl. .......................... 524/591; 524/755; 524/773; 528/49; 528/53; 528/61; 528/65; 528/68; 528/71; 528/85; 427/393
[58] Field of Search .................................. 524/591, 755, 524/773; 528/49, 53, 61, 65, 68, 71, 85; 427/393

[56] References Cited

U.S. PATENT DOCUMENTS

| | | | |
|---|---|---|---|
| 2,634,234 | 4/1953 | Kuhrt . | |
| 2,634,278 | 4/1953 | Kuhrt . | |
| 2,634,279 | 4/1953 | Kuhrt . | |
| 3,640,924 | 2/1972 | Hermann et al. | 528/71 |
| 3,808,162 | 4/1974 | Allen et al. | 528/49 |
| 4,046,729 | 9/1977 | Scriven et al. . | |
| 4,056,493 | 11/1977 | Tsou . | |
| 4,277,380 | 7/1981 | Williams et al. | 528/71 |
| 4,722,966 | 2/1988 | Flakus | 524/840 |
| 4,912,154 | 3/1990 | Arora et al. . | |
| 4,977,207 | 12/1990 | Hoefer et al. | 524/507 |
| 5,039,732 | 8/1991 | Arora | 524/591 |
| 5,095,069 | 3/1992 | Ambrose et al. | 524/591 |
| 5,104,737 | 4/1992 | Arora | 428/423.1 |
| 5,319,052 | 1/1994 | Prantl et al. . | |

FOREIGN PATENT DOCUMENTS

| | | |
|---|---|---|
| 0451657 | 4/1990 | European Pat. Off. . |
| 1966836 | 10/1968 | Germany . |
| 1966827 | 9/1969 | Germany . |
| 9201817 | 7/1990 | Germany . |
| 57-085815 | 11/1980 | Japan . |

OTHER PUBLICATIONS

Chem Abstract #117:49,722, May 1992.
*Waterborne Polyurethanes*, James W. Rosthauser and Klaus Nachtkamp (*Advances in Urethane Science and Technology;* ed. K. C. Frisch and D. Klempner, vol. 10, pp. 121–162 (1987), Technomic, Westport, Ct.).
*Aqueous Emulsions, Dispersions and Solutions of Polyurethanes; Synthesis and Properties*, D. Dieterich (*Progress in Organic Coatings*, 9(1981) 281–340, Elsevier Sequoia S. A., Lausanne—printed in The Netherlands.
*Driers for Water–borne oxidatively drying surface coatings* (Polymers Paint Colour Journal, vol. 182, No. 4311, Jul. 22, 1992 pp. 412–416.

Primary Examiner—James J. Seidleck
Assistant Examiner—John M. Cooney, Jr.
Attorney, Agent, or Firm—Fried, Frank, Harris, Shriver & Jacobson

[57] ABSTRACT

Water dispersible, one component, self crosslinkable poly(urethane-urea) composition that is stable and capable of curing at room temperature is prepared by forming a prepolymer comprising an alcoholized drying oil; a diisocyanate, a polyalkylene ether polyol, and a dihydroxy containing alkanoic acid polyol; neutralizing the prepolymer; contacting the neutralized prepolymer with water and diamine wherein the alcoholized drying oil has a sufficient content of monoglycerides to allow for chain extension in step (C) and the poly(urethane-urea) self-crosslinks upon drying. The waterborne poly(urethane-urea) composition exhibits good chemical resistance, adhesion, abrasion, and high gloss properties when used as a coating.

30 Claims, No Drawings

WATER-DISPERSIBLE POLY(URETHANE-UREA) COMPOSITIONS

RELATED APPLICATION

Reference is made to copending and commonly assigned U.S. Ser. No. 08/114,707, filed on Oct. 12, 1993 by Han Xiong Xiao, et al. entitled "Self-Crosslinkable Water-Dispersible Poly(Urethane-Urea) Compositions".

FIELD OF THE INVENTION

This invention relates to water-dispersible poly(urethane-urea) compositions that are useful as coatings.

BACKGROUND OF THE INVENTION

Solvent based poly(urethane-urea) compositions made from drying oils have been sold for use as coatings for fabrics, plastics, wood, metal, and the like. These coating compositions offer good properties at a reasonable price. Nevertheless, there is a continued need to develop new waterborne poly(urethane-urea) coatings based on drying oils for a number of reasons including environmental and economical concerns associated with solvents.

Although various preparations of drying oil based waterborne poly(urethane-urea) compositions are known, discovery of new preparations and alternative compositions is needed to extend the mechanical properties of the polyurethane compositions.

One problem in particular that is associated with poly(urethane-urea) water dispersions is the inability of the composition to crosslink at room temperature upon drying. This is desirable because the composition's properties, such as chemical resistance and mechanical strength, are extended upon the crosslinking. Copending application U.S. Ser. No. 08/114,707, identified above, describes a technique whereby crosslinking is achieved at room temperature by including a polyalkylene ether polyol in the polymer formation. The presence of the polyalkylene ether polyol allows for chain extension upon the inclusion of an amine and subsequent crosslinking of the poly(urethane-urea) upon drying. Although this method represents a valuable advance in the art because it is a one component, crosslinkable poly(urethane-urea) composition, it would be desirable to find alternative methods of preparing crosslinkable, one-component poly(urethane-urea) compositions.

SUMMARY OF THE INVENTION

The problems stated above have been solved with the discovery of novel poly(urethane-urea) compositions preparable by a process comprising: (A) forming a prepolymer comprising: (1) an alcoholized drying oil; (2) a diisocyanate; (3) a dihydroxy containing alkanoic acid polyol; (B) neutralizing said prepolymer; (C) contacting said neutralized prepolymer with water and a diamine to form an amine chain extended poly(urethane-urea) dispersion wherein said alcoholized drying oil has a sufficient content of monoglycerides to allow for chain extension in step (C) and whereby the chain-extended poly(urethane-urea) crosslinks upon drying.

In a second embodiment of the invention, a polyalkylene ether polyol is included in the prepolymer formation thus extending the composition's properties.

The inventive composition provides a one component, self-crosslinking composition that is stable and capable of drying and crosslinking at room temperature. The composition is useful as a coating because at least one of the following characteristics are exhibited, good chemical resistance, mechanical resistance, adequate adhesion, and high gloss.

DETAILED DESCRIPTION OF THE PREFERRED EMBODIMENT

Typically alcoholized drying oils are reaction products that comprise a mixture of unreacted fatty materials (drying oil), diglycerides, triglycerides, monoglycerides, and possibly excess alcohol (or polyol) and ester-interchange catalyst. Thus the typical alcoholized drying oil is a mixture of components with hydroxyl functionality of 2, 1, and 0.

It has been found that the control of the hydroxyl functionality of the alcoholized drying oil affects the character of poly(urethane-urea) compositions. As known monoglycerides have hydroxyl functionality of two. While not wishing to be bound by theory, it is believed that the hydroxyl functionality of monoglycerides lends the alcoholized drying oil unique properties to act as an emulsifier and thereby aid in water dispersion of the prepolymer. The water resistance of the overall composition is thus improved over similar compositions that do not used an alcoholized drying oil having a high content of monoglycerides. According to the invention the use of the high content of monoglycerides has been found to assist in controlling viscosity and gellation of the prepolymer. Consequently, once the prepolymer is neutralized, it is capable of reacting with the diamine resulting in chain extension of the composition. Further, the resulting composition crosslinks upon drying. As shown in the Comparative Example, hereinafter, prepolymer mixtures not having an alcoholized drying oil with a high content of monoglycerides resulted in a gellation which prevented chain extension with the diamine. The chain extension is desirable because it allows for a final poly(urethane-urea) composition to have a higher molecular weight, thus contributing to the desired mechanical properties.

According to the invention, alcoholized drying oils that may be used encompass any suitable fatty acids or drying oils that may be alcoholized in such a manner (or treated thereafter) to obtain a sufficiently high percentage of monoglycerides in the alcoholized drying oil product. The term "sufficient" content of monoglycerides is defined such that the prepolymer formed by the alcoholized drying oil, diisocyanate, and dihydroxy containing alkanoic acid polyol may be chain extended by diamine once neutralized (with the overall composition crosslinking upon drying). Preferably the alcoholized drying oil has least 50 weight % monoglyceride content, more preferably from at least 75 weight % monoglyceride content, and most preferably from 85 weight % to 98 weight % monoglyceride content (with the weight % based on the total weight of the alcoholized drying oil).

Preferred drying oils that may be alcoholized include dehydrated castor oil, soybean oil, sunflower oil, linseed oil, safflower oil, and mixtures thereof. Preferred fatty acids that may be alcoholized include linoleic acid, palmitoleic acid, linolenic acid, eleosteric acid, licanic acid, arachidonic acid, ricinoleic acid, and mixtures thereof. As used herein, the term fatty acid is interchangeable with drying oil. More preferably employed are drying oils selected from dehydrated castor oil, sunflower oil, linseed oil, safflower oil, soybean oil, or mixtures thereof, with linseed oil the most preferred. Particularly preferred alcohols and polyols that may be used for alcoholizing suitable fatty acid or drying oils may be selected from the group consisting of glycerol, adipate polyester polyol, caprolactone based polyol, polyether triol, polyester based triol, trimethylol propane, polyether diol, pentaerythritol, and mixtures thereof, with trimethylol propane, glycerol, and pentaerythritol more preferred, and glycerol and trimethylol propane most preferred. Preferably, the alcoholized drying oil is prepared by reacting the alcohol and drying oil in a ratio ranging from about 0.5:1 to about 10:1, more preferably from 0.75:1 to 5:1, and most preferably from 1:1 to 5:1, of alcohol:drying oil (as used herein, the term fatty acid is interchangeable with drying oil and the term alcohol is interchangeable with polyol).

As known, alcoholysis reactions typically employ esterification catalysts such as, metal hydroxides, oxides, and metal salts of organic acids. Substantial completion of the alcoholysis of the drying oil or fatty acid may be accomplished by techniques known to those skilled in the art. Preparing the alcoholized drying oils to have a high content of monoglycerides may be accomplished by any number of known techniques. Additionally, alcoholized drying oils having a high content of monoglycerides may be purchased as such, including, for example, commercially available sunflower oil monoglyceride MYVEROL™ 1892 (as sold by Eastman Chemical Co., Kingsport, Tenn.).

One useful method for preparing alcoholized drying oils having a high content of monoglycerides may be accomplished by molecular distillation, as described in U.S. Pat. Nos. 2,634,234; 2,634,278; and 2,634,279 (each issued to Kuhrt on Apr. 7, 1953, all of which are hereby incorporated by reference). The distillation process may be accomplished as a part of the alcoholysis of the drying oil or by a process separate from the alcoholysis reaction.

The diisocyanate component of the prepolymer may be aliphatic, alicyclic or aromatic. Aromatic diisocyanates may be less preferred in situations in which yellowing due to the effects of ultraviolet light is undesirable. Generally suitable diisocyanates have at least about 6 carbon atoms and usually do not have more than about 40 carbon atoms. Diisocyanates of about 6 to 20 carbon atoms in the hydrocarbon group are preferred such as those selected from the group consisting of 2,4-tolylene diisocyanate; 2,6-tolylene diisocyanate; 1,4-cyclohexane diisocyanate; dicyclohexylmethane 4,4'-diisocyanate ($H_{12}$MDI); xylylene diisocyanate, 1-isocyanato-3-isocyanatomethyl- 3,5,5-trimethylcyclohexane (isophorone diisocyanate) (IPDI); hexamethylene diisocyanate; tetramethylxylene diisocyanate (TMXDI); 2,4,4-trimethylhexamethylene diisocyanate, and mixtures thereof. Most preferably the diisocyanate is selected from the group consisting of $H_{12}$MDI, IPDI, TMXDI or mixtures thereof.

Although optional, the addition of polyalkylene ether polyol assists to reduce the functionality of the alcoholized drying oil mixture, thus assisting in avoiding gellation of the mixture prior to the chain extension that occurs when the diamine is contacted with the water dispersed prepolymer. Further, it is believed that the polyalkylene ether polyol improves the flexibility of the poly(urethane-urea) composition. When included, preferred polyalkylene ether polyols have a molecular weight of from about 400 to about 6000. More preferably the polyalkylene ether polyol is selected from poly(oxytetramethylene)glycol (PTMG); poly(oxypropylene)glycol (PPG); poly(caprolactone)glycol (PCL); poly(1,6-hexanediol adipate)glycol (PHAG); poly(1,4-butyl adipate)glycol (PBAG), hydroxy-terminated polybutadiene (Poly-bd); poly(carbonate)glycol (PCG), and mixtures thereof. Most preferably when used, the polyalkylene ether polyol is poly(oxytetramethylene)glycol.

The dihydroxy containing alkanoic acid polyol suitable for the prepolymer may have one or two substituents on the alpha carbon atoms. The substituent may be, for example, a hydroxyl or alkyl group (such as an alkylol group). The polyol has at least one carboxylic group, and generally has 1 to about 3 carboxylic groups, per molecule. The polyol alkanoic acids preferred are alkanoic acids having 2 to about 20 or more carbon atoms (more preferably from 2 to 10 carbon atoms), such as, tartaric acid, the 2,2,-dialkylol alkanoic acids (having, for example, an alkylol group of 1 to about 3 carbon atoms), and the like. A particularly preferred group of dihydroxy alkanoic acids are the 2,2-dimethylolalkanoic acids which may be represented by the structural formula

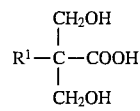

wherein $R^1$ represents hydrogen or a $C_1$–$C_8$ alkyl including, for example, 2,2-dimethylolalkanoic acids selected from 2,2-dimethylolacetic acid, 2,2-dimethylolpropionic acid, and mixtures thereof. Most preferably employed is 2,2-dimethylolpropionic acid (DMPA).

The prepolymer formed is a COOH-containing, NCO-terminated prepolymer. Techniques known to those skilled in the art may be employed in preparing the prepolymer. For example, the reaction may be carried out in the presence of a catalyst such as organo-tin compounds, tertiary amines, and the like, to assist diisocyanate-polyol reaction. More particularly, the prepolymer reaction may be carried out by reacting a stoichiometric excess of diisocyanate as compared with the total amount of the polyol component(s) (the dihydroxy alkanoic acid polyol and if used the polyalkylene ether polyol) and the alcoholized drying oil. The reaction temperature for making the prepolymer is generally elevated, but sufficiently low enough to avoid undue reaction of the carboxylic group of the dihydroxy alkanoic acid polyol with the diisocyanate. Such temperatures may be up to about 90° C. or more, with about 60° C. to 80° C. being preferred. Advantageously, the ratio of the —NCO group in the diisocyanate per isocyanate-reactive —OH group present in the mixture of polyols (i.e. the dihydroxy alkanoic acid polyol, alcoholized drying oil, and polyalkylene ether polyol if used) is present on an equivalent basis ranging from about 1:1 to about 2.5:1, more preferably from about 1.4:1 to 1.8:1, or most preferably approximately 1.6:1. When used, the amount of polyalkylene ether polyol is employed in a ratio of drying oil:polyalkylene ether polyol falling within the range of about 1:99 to about 99:1, more preferably from 10:90 to 80:20, and most preferably from 1:1 to 9:1. The acid value of the prepolymer preferably falls within the range of about 5 to 100, more preferably from about 10 to 60, on a solids basis. Preferably, an alkanoic acid polyol:alcoholized drying oil (plus polyalkylene ether polyol) ratio falling within a range of from about 10:1 to about 0.1:1, more preferably from 2:1 to 0.8:1, and most preferably approximately 1:1 is employed. The isocyanate group content of the prepolymer may be, for example, about 5 to 20 weight percent, preferably 10 to 20 weight percent, of the prepolymer solids.

The neutralization of the prepolymer may be accomplished by techniques known to those skilled in the art. Preferred neutralization agents include, for example, ammonium hydroxide or amines having at least one salt-forming amine, preferably a tertiary nitrogen group. Preferred agents include aliphatic tertiary amines, for example, trialkylamines having about 3 to about 12 carbon atoms, such as trimethylamines, methyl diethylamine, N,N-dimethylethanolamine, tripropylamine, and the like. The alkyl groups of the amine may be substituted with, for instance, hydroxy groups, such as alkanoltertiaryamines including dialkylmonoalkanol, alkyldialkanol and trialkanolamines. For purposes of availability, triethylamine [$N(C_2H_5)_3$] is the most preferred neutralization agent.

Upon neutralization, the prepolymer becomes a pendant salt group containing isocyanate terminated prepolymer (referred to hereinafter as an end-capped polymer salt).

Preferably an inert hydrophilic solvent is employed to facilitate contacting the neutralized polymer with water and diamine. Preferred hydrophilic solvents that may be employed include organic solvents that are essentially inert to the reaction (should not contain active hydrogen as determined by the Zerewitinoff test). Preferred solvents may be selected from dimethylformamide, esters, ethers, ketones (such as, methyl ethyl ketone and acetone), ketoesters, glycol-ether-esters, chlorinated hydrocarbons, aliphatic and alicyclic hydrocarbon pyrrolidones (such as, N-methylpyrrolidones), hydrogenated furans, and aromatic hydrocarbons. When employed, most preferably the solvent used is N-methylpyrrolidone.

Known drying agents commonly used in water-borne surface coatings may optionally be used after the neutralization, water dispersion, or amine chain reaction steps to aid the final composition in drying time (when typically a final product having been prepared using a drying agent dries more quickly once coated on a surface). Drying agents that may be used can be in a solid form or in solution, including, for example, organo-metal salts, such as, cobalt, manganese, vanadium, zirconium, zinc, barium, calcium, cerium and the like. When employed, preferably salts of cobalt, calcium, manganese and zirconium (more preferably cobalt, calcium, zirconium and mixtures thereof) are used as drying agents. The amount of drying agent used is generally based on the drying oil component in the formulation as within the skill of those familiar with the art.

After the neutralization step, water is contacted with the end-capped polymer salt in an amount sufficient to form a water dispersion. The amount of water necessary to form the dispersion is adjustable, depending upon a number of factors including, for example, viscosity and solids content. The term "dispersion", as used herein broadly encompasses a twophase aqueous poly(urethane-urea) system in which the poly(urethane-urea) is the dispersed phase. Preferably the water dispersion is prepared using a ratio of water:endcapped polymer salt of from about 50:1 to about 90:1, more preferably 50:1 to 80:1, and most preferably 60:1 to 70:1.

According to the invention, diamine is employed to react with the isocyanate groups of the endcapped polymer salt to provide for chain extension of the polymer. Preferably the diamine contains from 0 to 10 carbon atoms, with alkylene diamines having up to 6 carbon atoms more preferred. Most preferably employed is ethylene diamine. The amount of diamine used for the chain extension reaction may be varied depending upon the isocyanate equivalent weight of the prepolymer. Preferred stoichiometric amounts of diamine range from about 80% to about 105% based on the isocyanate equivalent. More preferably employed is a diamine within the range of from 90 to 100%, most preferably from 95 to 100%.

Preferably the method of preparation of the poly(urethane-urea) involves at least two sequential steps where the prepolymer is formed and neutralized. Upon neutralization, the endcapped polymer salt may be contacted with water and diamine simultaneously or stepwise. More preferably, the preparation occurs by sequential steps of formation of the prepolymer and neutralization followed by a water-dispersion step and immediately thereafter with a chain extension with diamine step. Most preferably, the neutralization step is followed by the optional step of exposing the endcapped polymer with a drying agent and water prior to including the diamine.

Preferably the poly(urethane-urea) dispersion has a pH ranging from about 7.5 to about 13, more preferably from 8 to 11, and most preferably fall between approximately 8 to 9. The viscosity of the dispersion is preferably from about 20 cps (cps=centipoise) to about 8000 cps, more preferably from 30 cps to 1000 cps, and most preferably approximately 50 to 100 cps at room temperature. The non-volatile solids content of the composition may generally range from 20 to 50% of the total weight of the dispersion, more preferably from about 28 to 35%.

The resulting poly(urethane-urea) dispersion is a room temperature crosslinkable, waterborne composition that is useful for coating applications. The crosslinking (or curing) of the dispersion occurs upon drying of the poly(urethane-urea) dispersion, typically after it is applied on a surface (preferably a hard surface) as a coating. Although not wishing to be bound by theory, it is believed that the crosslinking reaction operates through the oxidation and opening of the double bonds provided by the alcoholized drying oil component. The composition provides users with an easy to use, one-component coating that exhibits many desirable mechanical and chemical resistance characteristics, such as those described hereinafter in the examples. Although the water dispersion may generally dry at any temperature, one of the advantages of this invention is that the crosslinking reaction may occur at room temperature. Further, an additional second component is not required for the crosslinking reaction. The self-crosslinking that occurs upon the dispersion drying at room temperature provides one of the valuable advantages of this composition over the prior art. The crosslinking reaction is preferably accomplished at room temperature after a period of exposure in air preferably ranging from about 1 to about 15 days, more preferably 1 day to 8 days, and most preferably after 3 to 5 days.

The poly(urethane-urea) composition preferably provides translucent dispersions which produce glossy (preferably high glossy) rapid drying films with good mechanical properties and chemical resistance. The dispersion is useful for coating hard surfaces, particularly wood.

Optionally, additives which may be included in the dispersion include those commonly used in waterborne compositions, such as, for example, one or more of the following: plasticizers, pigments, colorants, surfactants, thickeners, heat stabilizers, leveling agents, and the like.

The following examples provide illustration of the invention but are not intended to limit the scope of the invention thereto.

EXAMPLES

CHART A

EXAMPLES OF POLY(URETHANE-UREA) DISPERSIONS

| Example No. | Alcohol for Alcoholysis | Ratio Alcohol to Oil | Ratio Alcoholized Oil to Polyol [PTMG]$^1$ | Ratio DMPA$^2$ to Polyol | Ratio Isocyanate$^3$ to Polyol NCO:OH |
|---|---|---|---|---|---|
| 1 | Trimethylol Propane | 5:1 | 4:1 | 1:1 | 1.6:1 |
| 2 | Glycerol | N/A | 4:1 | 1:1 | 1.6:1 |

| Example No. | Alcohol for Alcoholysis | Ratio Alcohol to Oil | Ratio Alcoholized Oil to Polyol [PTMG][1] | Ratio DMPA[2] to Polyol | Ratio Isocyanate[3] to Polyol NCO:OH |
|---|---|---|---|---|---|
| 3 | Glycerol | N/A | 4:1 | 1:1 | 1.6:1 |
| 4 | Glycerol | N/A | 4:1 | 0.75:1 | 1.6:1 |

[1] PTMG is poly(oxytetramethylene) glycol purchased as TERATHANE ™ 2000 from E. I. duPont deNemours, Wilmington, DE.
[2] DMPA is dimethylolpropionic acid, purchased from Rhone-Poulenc Chemical Co., CT.
[3] The diisocyanate was dicyclohexylmethane 4 4'-diisocyanate, purchased as DESMODUR ™ W from Miles Chem. Co., Pittsburgh, PA.

The alcoholized drying oil in Examples 1–4 was prepared or obtained as having a high yield of monoglycerides. The characterization of the alcoholized drying oils for each example is summarized in CHART B below.

CHART B

| EXAMPLE | OIL/POLYOL RATIO | MOLECULAR DISTILLATION | | ANALYSIS | |
|---|---|---|---|---|---|
| | | TEMP °C. | VACUUM mTorr | GC | OH |
| 18 | Linseed Oil/Trimethylolpropane Trimethylolpropane 1:5 | 190–240 | 8–16 | 50–85% | 316 |
| 19 | Linseed Oil/Glycerol 1:5 | 190–240 | 8–16 | 50–90% | 316–320 |
| 20–21 | Sunflower Oil/Glycerol (MYVEROL ™ 1892) | — | — | 95%+ | 316–320 |

Example 1

One hundred parts of alkali refined linseed oil was charged into a 500 ml reaction kettle, equipped with a thermometer, dry nitrogen inlet for sub-surface purging, electrical stirrer and heating jacket. The linseed oil was gradually heated to 110° C. and 76.48 parts trimethylolpropane (TMP), at a 5:1 mole ratio of alcohol (polyol) to linseed oil, were added to the reaction kettle, under sufficient agitation. The agitation rate was adjusted throughout the reaction to maintain a vortex ensuring efficient mixing.

The temperature was increased to 200° C. and 0.18–0.2 parts (based on total weight) of transesterification catalyst (sodium hydroxide) were added. The temperature was raised to 220° C. and maintained at this temperature for one hour. At the end of this period the cloudy reaction mixture was clear and the alcoholysis reaction was taken to be complete. A slight excess of phosphoric acid was added immediately to neutralize the catalyst and prevent a reverse reaction. The resulting alcoholized product was cooled to room temperature and stored under a blanket of nitrogen. The alcoholized product, a mixture of monoglycerides, diglycerides, unreacted polyol, unreacted oil was subjected to molecular distillation using a Molecular Still 3 (CVC Products, Rochester, N.Y.). The unreacted polyol was separated (by decantation or filtration) and the alcoholized product was distilled at a temperature ranging from 190° to 240° C. and under a high vacuum of 10–16 milliTorr. The linseed oil monoglyceride was obtained as the distillate.

The hydroxyl value of the distillate, as determined by ASTM D1957-86, was 316–320. Gas chromatography analysis indicated a presence of 50– 90% monoglyceride.

A reaction kettle equipped with a thermometer, dry nitrogen inlet, stirrer and heating jacket was charged with 20 parts of the above oil polyol, 28.35 parts of a polytetramethylene glycol ether (PTMG) at 4.0/1.0 ratio of oil polyol/PTMG, 9.5 parts of dimethylolpropionic acid (DMPA) at 1.0/1.0 of DMPA/polyol ratio, 59.43 parts of dicyclohexylmethane 4-4'diisocyanate ($H_{12}$MDI) at 1.6/1.0 of NCO/OH ratio and 0.1 parts of T-12 catalyst (dibutyl tin dilaurate catalyst) under dry nitrogen. The mixture was heated to 80° C. with agitation and the mixture was kept at this temperature until no DMPA particles were observed. The preparation of pendant COOH-containing NCO-terminated prepolymer based on the alcoholized linseed oil was complete when the NCO content, as determined by a di-n-butyl amine titration, was close to the theoretical NCO content (5.64%).

The reaction mixture was cooled to 60° C. and 7.17 parts of TEA (triethylamine) was added to it under agitation to carry out the neutralization between the COOH group of the prepolymer and TEA. The neutralization was kept at the same temperature for about 30 minutes to obtain the pendant internal salt group-containing NCO-terminated prepolymer.

The reaction mixture was further cooled to 50° C. and 15.0 parts of N-methylpyrrolidone (NMP), 0.02 part of cobalt hydrocure drier, and 0.01 part of calcium drier were added with stirring. Immediately, 200 parts of water were added to the above mixture under vigorous agitation to carry out the dispersion thus forming the aqueous pendant salt group-containing NCO-terminated prepolymer.

To this dispersion was added rapidly 4.55 parts of ethylenediamine (EDA) to carry out the chain extension.

The resulting coating composition had a pH of about 8–9, a viscosity of about 50–100 cps at room temperature and a non-volatile content of about 28–35%. The coating was a translucent dispersion producing a high-gloss, rapid drying film with good mechanical properties and chemical resistance after exposure in air for 3–5 days due to the crosslinking reaction through the oxidation and opening of the double bonds in the linseed oil structure of the coating.

Example 2

Example 1 was repeated with the exception that glycerol was substituted as the trimethylpropane as the polyol in the alcoholysis reaction.

Examples 3 and 4

The commercially available sunflower oil monoglyceride, MYVEROL™ 1892 (obtained from Eastman Chemical Co., Kingspork, Tenn.), was incorporated as the oil-polyol. The oil-polyol/PTMG ratios were maintained at 4:1, and NCO/OH ratio was 1.6:1, with 1:1 ratio of DMPA/polyol for example 3 and 0.75:1 ratio of DMPA/polyol for example 4.

The resulting coating compositions had a pH of about 8–9, viscosity of 5–100 cps at room temperature and a non-volatile content of about 28–35%. The coating was a translucent dispersion which produces a high gloss, rapid drying film with good mechanical and chemical properties after being exposed to air for 3–5 days.

Comparative Example

Examples I and II of U.S. Pat. No. 4,277,380 (issued Jul. 7, 1981 to Williams et al, assigned to Textron, Inc.) were followed, as follows.

One-hundred (100) parts of alkali refined linseed oil was charged in a 500 ml reaction kettle, equipped with a thermometer, dry nitrogen inlet, electrical stirrer and heating jacket. The linseed oil was preheated to 277°–287° C. with agitation for about 30 min, under nitrogen gas to maintain a light color. Linseed oil was then cooled to 240°–250° C. and 13.8 parts of pentaerythritol was added rapidly. Calcium naphthanate (5% Ca) transesterification catalyst (0.08 parts) was added to the above mixture. That temperature was maintained until the cloudy mixture became clear. After that, the solubility of the reaction product was checked in ethanol or methanol. When a clear solution of the product in ethanol or methanol was observed, the alcoholysis was completed.

A reaction kettle equipped with a thermometer, dry nitrogen inlet, stirrer and heating jacket was charged with 100 parts of toluene diisocyanate, 96.3 parts of acetone, 41.6 parts of DMPA, 0.077 parts of T-12 catalyst under nitrogen atmosphere. The ratio of 0.79/1.0 of NCO/OH and 0.75/1.0 of DMPA/polyol were used for making carboxylic group-containing, isocyanate terminated prepolymer. It was used in the preparation of the oil modified-urethane polymers. The reaction mixture was heated to 57° C. and kept at that temperature until the isocyanate content (as determined by DBA titration method) measured between 9.3–9.5.

The reaction mixture was then cooled down to 45° C. and 243.8 parts of alcoholized linseed oil was added to it over a period of about 1 hour. After the completion of addition of oil polyol, the temperature of the reaction mixture was raised to 57° C., and the reaction was continued for about five hours until the NCO value of less than 0.5% was reached.

To this polymer solution, 165 part of butoxyethanol was added and the mixture was then heated to 50° C. and acetone was distilled off partially to get a resinous polymer solution of oil modified carboxylic group containing urethane.

An aqueous coating composition containing a dispersion of the ammonia-neutralized polymer was prepared by mixing the following ingredients in the following order indicated below to the above oil modified carboxylic group-containing urethane polymer solution.

| Ingredient | Parts |
|---|---|
| Cobalt hydrocure drier | 1.54 |
| Manganese hydrocure drier | 1.54 |
| Activ-8* (38%, 1.10 phenanthroline) | 1.54 |
| L5310** (20% in Butyl Cellosolve) | 2.57 |
| Ammonium Hydroxide (28%) solution | 18.85 |
| Water | 931.0 |

*Drier Accelerator
**Silicone resin anti-foaming agent

The waterborne product from this comparison was dark, brittle, and exhibited poor mechanical properties. Diamine was not added to the product because the NCO/OH was less than 1.0, and chain extension with the diamine was not possible.

That which is claimed is:

1. A self-crosslinking coating composition prepared by a process comprising in a stepwise method:
   (A) forming a prepolymer comprising:
      (1) an alcoholized drying oil;
      (2) a diisocyanate;
      (3) a dihydroxy containing alkanoic acid polyol;
   (B) neutralizing said prepolymer before chain extension;
   (C) contacting said neutralized prepolymer with water and a diamine to form an amine chain extended poly(urethane-urea) dispersion wherein said alcoholized drying oil is selected in step (A) so as to have a sufficient content of monoglycerides to allow the amine chain-extended poly(urethane-urea) to self-crosslink upon drying.

2. A composition according to claim 1 wherein said alcoholized drying oil has a monoglyceride content of at least 50 weight %, with the weight % based on the total weight of the alcoholized drying oil.

3. A composition according to claim 2 wherein said alcoholized drying oil has a monoglyceride content of at least 75 weight %.

4. A composition according to claim 1 wherein said alcoholized drying oil has a monoglyceride content of from 85 weight % to 98 weight %.

5. A composition according to claim 4 wherein said drying oil is alcoholized by a polyol selected from the group consisting of trimethylol propane and glycerol.

6. A composition according to claim 5 wherein said drying oil is alcoholized by trimethylol propane or glycerol in a reaction employing a ratio of polyol:drying oil within a molar range of from 1:1 to 5:1.

7. A composition according to claim 6 further comprising a polyalkylene ether polyol in said prepolymer.

8. A composition according to claim 7 wherein said polyalkylene ether polyol is selected from the group consisting of poly(oxytetramethylene)glycol, poly(oxypropylene)glycol, poly(caprolactone)glycol, poly(1,6-hexanediol adipate)glycol, poly(1,4-butyl adipate)glycol, hydroxy-terminated polybutadiene, poly(carbonate)glycol, and mixtures thereof, and said alcoholized drying oil and polyalkylene ether polyol are employed in a molar ratio of alcoholized drying oil:polyalkylene ether polyol of 10:90 to 80:20.

9. A composition according to claim 1 further comprising a polyalkylene ether polyol selected from the group the group consisting of poly(oxytetramethylene)glycol, poly(oxypropylene)glycol, poly(caprolactone)glycol, poly(1,6-hexadiol adipate)glycol, poly(1,4-butyl adipate)glycol, hydroxy-terminated polybutadiene, poly(carbonate)glycol, and mixtures thereof, and said alcoholized drying oil and polyalkylene ether polyol are employed in a molar ratio of alcoholized drying oil:polyalkylene ether polyol of 1:99 to 99:1.

10. A composition according to claim 9 wherein in step (C) aid water, a drying agent, and a hydrophilic solvent are contacted with said neutralized prepolymer prior to contacting said neutralized prepolymer with said diamine.

11. A composition according to claim 10 wherein in step (A) said diisocyanate is selected from the group consisting of 2,4-tolylene diisocyanate, 2,6-tolylene diisocyanate, 1,4-clohexane diisocyanate, dicyclohexylmethane 4,4'-diisocyanate, xylylene diisocyanate, 1-isocyanato-3-isocyanatomethyl-3,5,5-trimethylcyclohexane, hexamethylene diisocyanate; tetramethylxylene diisocyanate, 2,4,4-trimethylhexamethylene diisocyanate, and mixtures thereof; said dihydroxy containing alkanoic acid is a 2,2-dimethylolalkanoic acid represented by a structural formula:

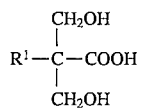

wherein $R^1$ represents hydrogen or a $C_1$–$C_8$ alkyl;

in step (C) said water is present in a weight ratio of water to neutralized prepolymer of from about 50:1 to about 90:1; and said poly(urethane-urea) dispersion has a viscosity of from 30 to 100 cps.

12. A composition according to claim 11 wherein in step (A) said diisocyanate is selected from the group consisting of dicyclohexylmethane 4,4'-diisocyanate, 1-isocyanato- 3-isocyanatomethyl-3,5,5-trimethylcyclohexane, tetramethylxylene diisocyanate, and mixtures thereof; and said dihydroxy containing alkanoic acid is 2,2-dimethylolpropionic acid;

in step (B) said prepolymer is neutralized with a triethylamine;

in step (C) said water is present in a weight ratio of water to neutralized prepolymer of from about 60:1 to about 70:1 and said diamine is ethylene diamine; and said poly(urethane-urea) dispersion has a viscosity of from 50 to 100 cps.

13. A composition according to claim 1 wherein in step (A) said drying oil is linseed oil alcoholized with trimethylol propane in a molar ratio of polyol:drying oil of 1:1 to 5:1 and said alcoholized drying oil has a monoglyceride content of from 85 weight % to 98 weight % (based on the total weight of the alcoholized drying oil); said diisocyanate is dicyclohexylmethane 4, 4'-diisocyanate; said dihydroxyalkanoic acid is 2,2-dimethylolpropionic acid;

in step (B) said neutralizing agent is a triethylamine;

in step (C) said neutralized prepolymer is contacted with a drying agent, hydrophilic solvent, and water prior to said diamine.

14. A method for preparing a self-crosslinking poly(urethane-urea) composition comprising in a stepwise fashion:

(A) forming a prepolymer comprising:
(1) an alcoholized drying oil;
(2) a diisocyanate;
(3) a dihydroxy containing alkanoic acid polyol;

(B) neutralizing said prepolymer before chain extension;

(C) contacting said neutralized prepolymer with water and a diamine to form an amine chain extended poly(urethane-urea) dispersion wherein said alcoholized drying oil is selected in step (A) so as to have a sufficient content of monoglycerides to allow the amine chain-extended poly(urethane-urea) to self-crosslink upon drying.

15. A method according to claim 14 wherein said alcoholized drying oil has at least a 50 weight % content of monoglyceride, weight the weight % based on the total weight of the alcoholized drying oil.

16. A method according to claim 15 wherein said alcoholized drying oil has at least a 75 weight % monoglyceride content.

17. A method according to claim 16 wherein said alcoholized drying oil has a monoglyceride content of from 85 weight % to 95 weight %.

18. A method according to claim 17 further comprising a poly(alkylene) ether polyol in said prepolymer.

19. A method according to claim 14 further comprising a poly(alkylene) ether polyol in said prepolymer.

20. A method of using as a coating for wood surfaces a self-crosslinking water-dispersible poly(urethane-urea) composition prepared by a process comprising in a stepwise method:

(A) forming a prepolymer comprising:
(1) an alcoholized drying oil;
(2) a diisocyanate;
(3) a dihydroxy containing alkanoic acid polyol;

(B) neutralizing said prepolymer before chain extension;

(C) contacting said neutralized prepolymer with water and a diamine to form an amine chain extended poly(urethane-urea) dispersion wherein said alcoholized drying oil is selected in step (A) so as to have a sufficient content of monoglycerides to allow the amine chain-extended poly(urethane-urea) to self-crosslink upon drying wherein said self-crosslinking water dispersible poly(urethane urea) composition is coated onto a wood surface.

21. A method according to claim 20 wherein said prepolymer further comprises a polyalkylene ether polyol.

22. The self-crosslinking coating composition of claim 1 wherein in step (A) the alcoholized drying oil is distilled so as to have a sufficient content of monoglycerides.

23. The self-crosslinking coating composition of claim 1 wherein in step (A) the alcoholized drying oil is processed so as to reduce the amount of components with a hydroxyl functionality of 0 and 1.

24. The self-crosslinking coating composition of claim 1 wherein in step (A) the alcoholized drying oil is comprised of substantially monoglycerides.

25. The method of claim 14 wherein in step (A) the alcoholized drying oil is distilled so as to have a sufficient content of monoglycerides.

26. The method of claim 14 wherein in step (A) the alcoholized drying oil is processed so as to reduce the amount of components with a hydroxyl functionality of 0 and 1.

27. The method of claim 14 wherein in step (A) the alcoholized drying oil is comprised of substantially monoglycerides.

28. The method of claim 20 wherein in step (A) the alcoholized drying oil is distilled so as to have a sufficient content of monoglycerides.

29. The method of claim 20 wherein in step (A) the alcoholized drying oil is processed so as to reduce the amount of components with a hydroxyl functionality of 0 and 1.

30. The method of claim 20 wherein in step (A) the alcoholized drying oil is comprised of substantially monoglycerides.

\* \* \* \* \*